Patented Aug. 29, 1944

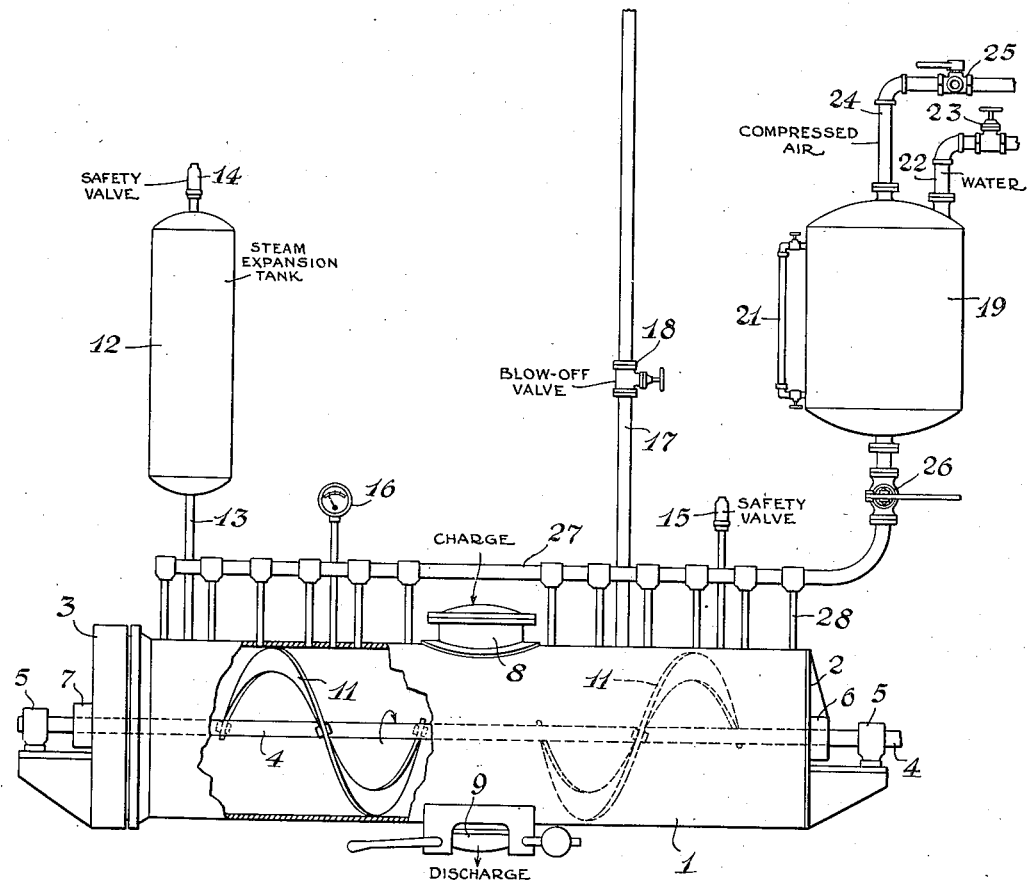

2,356,760

UNITED STATES PATENT OFFICE 2,356,760

METHOD OF HYDRATING DOLOMITIC LIMES

William D. Garvin, Charlestown, W. Va., assignor to the Standard Lime and Stone Company, Baltimore, Md., a corporation of Maryland Application January 31, 1941, Serial No. 376,919

4 Claims. (Cl. 23—188)

This invention relates to a method of hydrating dolomitic lime, the method providing a single stage hydration resulting in a dry dolomitic lime hydrate in which both the calcium oxide and the magnesium oxide are so nearly completely hydrated as to be entirely satisfactory for commercial purposes. The cost of apparatus is not prohibitive and the time of treatment is comparable with that required for hydration of calcium limes.

Hydration of the constituents of lime is accomplished by marked expansion. Prior art commercial methods of hydrating dolomitic limes resulted in only partial hydration of the magnesium oxide constituent because the reaction time for hydrating the magnesium oxide is much longer than that for hydrating the calcium oxide and the time allowed in commercial processes was inadequate. Slow hydration and consequent expansion, occurring after use in mortars and plasters, have given trouble and have created considerable objection to dolomitic limes.

The invention takes advantage of the fact that the rate of hydration of magnesium oxide increases with temperature and pressure. This increase of rate is quite rapid as temperature is raised from ordinary atmospheric temperatures to 100° C. but the increase is less rapid and gradually slackens above this temperature. At a temperature of nearly 183° C. (say 361° F.), which corresponds to a saturated steam pressure of approximately 140 lbs. gauge, the reaction is sufficiently rapid for commercial purposes so that there is no practical advantage in operating at higher pressures. At the temperature and pressure stated about 90% of the magnesium oxide can be converted to the hydrate in a period between fifteen and twenty minutes. While higher temperatures and corresponding higher pressures have the effect of shortening the time somewhat, the gain is not commercially important, and furthermore the cost of the heavier and stronger apparatus is not economically justifiable. Furthermore, the higher temperatures commonly have the effect of impairing the working qualities of the hydrated lime for use as plaster, particularly as to finish qualities.

The invention provides a means for developing the desired temperature and pressure without the use of any extraneous source of heat, so that dolomitic lime can be substantially completely hydrated in a single stage at a commercial rate and at a cost which renders the process commercially attractive. The period of twenty minutes above stated corresponds to the usual commercial practice in the industry where lime is hydrated by previously known methods. Within this time period, according to past practice, the conversion of magnesium oxide into the hydroxide was rarely as high as 15% and usually was much less. To increase the percentage of magnesium oxide converted required a prohibitive increase in the time of treatment using prior art procedures.

Because of this fact attempts have been made in the prior art to provide for a second stage of hydration in which a partially hydrated dolomitic lime is treated with steam under pressure in an autoclave for the purpose of hydrating the remaining magnesium oxide. This is a two-stage process, which is inconvenient, slow and needlessly expensive.

As a basis for describing the preferred procedure in greater detail reference will now be made to the accompanying drawing which shows a device suited for practising the invention in elevation, with parts broken away to show the internal construction.

The apparatus comprises a fixed horizontal cylindrical shell 1 closed at its ends by heads 2 and 3. Extending axially through the shell is a shaft 4 which is sustained in bearings 5 outside the shell. Suitable pressure retaining means are provided in the glands 6 and 7 to prevent serious leakage around the shaft where it passes through the heads 2 and 3. At the top of the shell 1, preferably at mid-length, is the charging opening 8 provided with a tight-fitting, pressure retaining cover, as indicated in the drawing. Immediately below the charging opening 8 is the discharge opening 9, likewise provided with a tight-fitting closure, as shown. Both the closures above mentioned are preferably of the quick opening and closing type, but since no novelty is claimed for such closures, it is unnecessary to illustrate them in detail.

Mounted on the shaft 4 are stirring means which, in the example illustrated, take the form of two spiral blades, the two blades being of opposite pitch. Any arrangement which will secure adequate stirring and good distribution throughout the length of the shell 1 may be used.

To increase the volume of the shell 1 and limit the development of steam pressure, an expansion chamber 12 is connected by pipe 13 with the shell. A safety valve 14, preferably set to blow off at about 150 lbs. gauge, is provided. A similar safety valve 15, similarly adjusted, may, if desired, be applied directly to the shell 1. A pressure gauge 16 is shown connected to indicate the pressure in the shell 1. This is preferably of the recording type to offer better control of the process. Since the pressure in the expansion chamber 12 is approximately the same as that in the shell 1, the gauge 16 could be applied to the expansion chamber 12 with the same results.

A blow-off pipe 17 is connected with the shell 1 and is controlled by blow-off valve 18 which is closed during the hydration operation. Pipe 17 leads to a point outside the building or enclosure in which the shell 1 is installed.

The tank 19 serves as a water-measuring volume and is provided with water level gauge glass 21, water supply connection 22, controlled by valve 23, and compressed air supply connection 24 controlled by the valve 25. It is preferred that the valve 25 be of the three-way type, so arranged that in one position it cuts off the supply of compressed air to the tank 19 and vents the tank to atmosphere, and in another position closes the vent and connects the compressed air supply with the tank. The measuring tank 19 is connected through the quick opening gate valve 26 with a manifold 27 which is of substantial cross-sectional area and which extends along and preferably above the shell 1. The manifold 27 is connected with the interior of the shell 1 by a plurality of branches 28.

The sizes of the manifold 27, valve 26 and branches 28, are such as to deliver the charge of water into the shell 1 so rapidly that all the water will be delivered in a very short interval of time. This is important because it is highly desirable to introduce the entire water charge so rapidly that local reactions, resulting in undesirably high local temperatures, will not occur. The tank 19 is of sufficient volume to contain the desired measured charge of water. The quantity of water is based on the weight of the charge of lime placed in the shell 1. Compressed air may be supplied through connection 24 to a pressure of about 90 lbs. gauge, experience having demonstrated that with this pressure and a manifold of practicable size it is possible to introduce the entire charge of water into the shell 1 with sufficient rapidity.

In charging the apparatus the discharge opening 9 is closed, the valve 26 is closed, and the blow-off valve 18 is open. Shell 1 is charged with dolomitic lime, preferably crushed to ½ in. size and smaller, through the opening 8 which is then closed. With the air valve 25 in venting position, the tank 9 is charged with water to the proper level, after which the water valve 23 is closed and the air valve 25 is shifted to subject the water in the tank 19 to a static head of about 90 pounds gauge. The air pressure used is not important except that it must be sufficient to deliver all the charge in the tank 19 rapidly against any pressure which may develop in shell 1 during such delivery.

The charge preferably is in the ratio of 100 parts of lime to 47 parts of water by weight. With the shell and the water tank charged, the valve 26 is quickly opened to permit rapid delivery of the entire water charge into the shell, and then closed. At such time the shaft 4 is rotated to stir the lime and water together. The reaction starts rapidly and develops steam pressure. The steam quickly sweeps the shell 1 free of air which escapes through the bleed valve 18. As soon as this occurs the valve 18 is closed and the steam pressure rapidly rises in the shell 1 to about 140 pounds gauge. This corresponds to a saturated steam temperature of approximately 183° C.

The volumes of the shell 1 and of the expansion chamber 12 are so chosen that under normal conditions the pressure will not rise substantially above the value set, but if it should rise about 10 lbs. above that limit, the safety valve 14 or 15, or both, will open, relieving the excess pressure. Operation of the safety valves is considered undesirable because powdered hydrated lime is carried into the valves and causes some inconvenience.

It has been determined that when hydration of both the calcium and magnesium oxides is completed (and under the pressure and temperature conditions stated this requires between fifteen and twenty minutes) the steam pressure will have fallen to about 80 pounds gauge. The blow-off valve 18 is then opened to permit the pressure in shell 1 to drop to atmospheric. This is attended with the discharge of excess water as steam. When the pressure has been dissipated, the discharge port 9 is opened and the hydrated lime is discharged through the port with the assistance of the spiral conveyor blades 11. The resulting hydrate is a powder having a water content of about 26%. The desired result is thus secured in about the time at present required for the hydration of calcium limes by prior art methods.

The following values are illustrative:

The raw dolomite used would have about the following composition:

| | |
|---|---|
| $CaCO_3$ | 55.20 |
| $MgCO_3$ | 44.06 |
| $SiO_2$ | 0.46 |
| $Fe_2O_3$ | 0.18 |
| $Al_2O_3$ | 0.10 |

The dolomitic lime produced by complete calcination of this dolomite would have the composition:

| | |
|---|---|
| $CaO$ | 58.74 |
| $MgO$ | 39.85 |
| $SiO$ | 0.88 |
| $Al_2O_3$ | 0.34 |
| $Fe_2O_3$ | 0.19 |

Completely hydrated lime produced from this dolomitic lime would have the composition:

| | |
|---|---|
| $CaO$ | 42.93 |
| $MgO$ | 29.13 |
| $SiO$ | 0.64 |
| $Al_2O_3$ | 0.25 |
| $Fe_2O_3$ | 0.14 |
| $H_2O$ | 26.91 |

From above it will be apparent that 36.81 parts of water are theoretically required for 100 parts of dolomitic lime (by weight). The amount of water actually added in the hydrating apparatus is 47 parts, so that the method contemplates an excess of 28% of water over the quantity theoretically required. Stated differently, the percentage of water required for complete hydration of the basic oxides in dolomitic lime is 26.91%. The amount of water in the hydrated dolomitic lime resulting from the process is 26%. On this basis it appears that the calcium oxide is completely hydrated and 93% of the magnesium oxide is hydrated. The above values are calculated on the assumption of complete calcination of both basic oxides, that is to say, there is assumed to be no carbonate content in the dolomitic lime, and it is assumed that none of the lime or magnesia is combined with silica, alumina or ferric oxide. Since this condition is not encountered in practice, it appears that in fact more than 93% of the available magnesium oxide is hydrated.

The example above given is illustrative and the values stated are not critical. On the contrary they are subject to variation within a useful range of considerable extent. The invention contemplates a single stage hydration of comparatively short duration at elevated temperature and under steam pressure, the heat for generating the steam being supplied by the reaction itself. From one point of view it might be said that the hydration reaction of the calcium oxide constituent provides the heat which generates the steam for steam hydration of the magnesium oxide constituent. However, the effects are interrelated and it is impossible and unnecessary to attempt to segregate them. The important thing is that a single stage hydration of dolomitic lime is secured and is so nearly complete as to be satisfactory for the highest commercial requirements. In any event it is very decidedly better than results secured with any prior art single stage process now known.

The invention contemplates a reasonably accurate balance between the quantity of lime and the quantity of water used. The attainment of the desired temperature and pressure is dependent on the use of a suitable volume within the confining structure in which the reaction takes place.

The purpose of stating the particular values above set forth is to describe in detail the best known way in which the invention may be practiced. This does not imply any necessary limitation to these particular values, which are preferred for commercial purposes because they are easily attained, produce a hydrated lime for use in plaster which has good working qualities, and which is generally available for other purposes. The process can be carried out at lower temperatures and pressures where a longer time of reaction or a lower degree of hydration, either or both, can be tolerated. Higher temperatures and pressures can be used, particularly where the resulting product need not have particular finishing properties, such as are required when it is to be used in plaster. While the ranges suggested are believed to be particularly desirable for limes to be used in plaster, they are not critical even in that field.

The invention contemplates that dolomitic lime and a quantity of water, some 25 to 30% in excess of the theoretical requirements for complete hydration of the magnesium oxide and calcium oxide content of the lime, are rapidly mixed in a closed volume such as to insure the development of a steam pressure, preferably of the order of 140 lbs. gauge. Commercially complete hydration will then occur in twenty minutes or less and will normally be indicated by a pressure drop to about 80 lbs. per sq. in. gauge.

The purpose of opening the blow-off valve is to relieve the pressure rapidly and to insure the evaporation and discharge of excess water. The quantity of water, provided it be moderately in excess of that necessary for complete hydration, is not vitally important. The required quantity will depend somewhat on the nature of the lime, and an undue excess of water has chiefly the disadvantage of a moist or wet hydrate.

The important aspect of the invention is that it provides a single stage hydration which occurs in a reasonable time and for which all the necessary heat is developed by the hydration reaction. The process requires relatively simple apparatus and a time period comparable to that commercially used heretofore with inferior results in only partially hydrating dolomitic limes.

I claim:
1. The method of hydrating in one treatment both the calcium oxide and the magnesium oxide constituents of dolomitic lime which comprises reacting such lime with a quantity of water in a closed volume, the water being so rapidly introduced and mixed with the lime as substantially to suppress local intense reactions, and the quantity of water and the volume being so chosen that the heat of reaction develops a maximum steam pressure of about 140 pounds per square inch gauge; continuing the reaction while stirring the lime and water together until the steam pressure falls to about 80 pounds per square inch gauge; and then venting said volume rapidly.

2. The method of hydrating the calcium and magnesium oxide constituents of dolomitic lime which comprises causing the lime to react with water in a closed volume, the water being so rapidly introduced and mixed with the lime as substantially to suppress local intense reactions, and the quantity of water being so related to the quantity of lime that the water is substantially in excess of the quantity theoretically required for complete hydration, and not more than can be vaporized by the heat of reaction, and the closed volume being such relatively to the lime and water that a steam pressure and temperature sufficient to ensure hydration of the magnesium oxide constituent is attained as a result of the reaction such pressure being of the order of 140 pounds per sq. in. gauge; causing the reaction to continue for a period of the order of twenty minutes, and then venting the volume to discharge excess water as steam and thus bring the hydrated lime to a substantially dry state.

3. The method of hydrating in one treatment both the calcium oxide and the magnesium oxide constituents of dolomitic lime which comprises actively mixing such lime with an entire charge of water in a closed volume, the quantity of water making up the charge exceeding by the order of 25 to 30% the amount theoretically required for the complete hydration of the lime and the closed volume being so chosen that the heat of reaction develops a steam pressure of about 140 pounds per sq. in. gauge, continuing the reaction until the steam pressure falls to the order of 80 pounds per sq. in. gauge, then venting the volume to discharge the excess water in the vapor phase, to obtain in a period of the order of 20 minutes a substantially dry hydrate in which over 90% of the magnesium oxide is hydrated.

4. The method of producing by one treatment a hydrated lime commercially free of grainy structure, from dolomitic lime, which comprises mixing a charge of lime and an entire charge of water in a closed volume so rapidly that local reactions more intense than the general average are substantially suppressed, the quantities of water and lime and the volume being so chosen that the heat of reaction vaporizes the water and develops a pressure of the order of 140 pounds per square inch gauge, sufficient to accelerate hydration of the magnesium oxide content of the lime and insufficient to impair the working qualities of the resulting hydrate.

WILLIAM D. GARVIN.